(12) United States Patent
Bender et al.

(10) Patent No.: US 10,395,017 B2
(45) Date of Patent: Aug. 27, 2019

(54) SELECTIVELY REDACTING DIGITAL FOOTPRINT INFORMATION IN ORDER TO IMPROVE COMPUTER DATA SECURITY

(71) Applicant: International Business Machines Corporation, Armonk, NY (US)

(72) Inventors: Michael Bender, Rye Brook, NY (US); Rhonda L. Childress, Austin, TX (US); Timothy J. Hahn, Cary, NC (US); David B. Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/421,512

(22) Filed: Feb. 1, 2017

(65) Prior Publication Data
US 2018/0218175 A1 Aug. 2, 2018

(51) Int. Cl.
*G06F 21/62* (2013.01)
*G06F 21/31* (2013.01)

(52) U.S. Cl.
CPC .................. *G06F 21/316* (2013.01)

(58) Field of Classification Search
CPC ............... G06F 21/316; G06F 21/6263; G06F 21/6254; G06F 21/00; G06F 21/6272;
(Continued)

(56) References Cited

U.S. PATENT DOCUMENTS 8,756,703 B2  6/2014 Kovacs et al.
9,275,420 B1  3/2016 Fredinburg et al.
(Continued)

FOREIGN PATENT DOCUMENTS

CN  102194148 A  9/2011
WO  2014127429 A1  8/2014
WO  2014175721 A1  10/2014

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Kevin Bechtel
*Assistant Examiner* — Quazi Farooqui
(74) *Attorney, Agent, or Firm* — Law Office of Jim Boice

(57) ABSTRACT

A computer-implemented method improves a computer system's security through use of a simulated digital footprint. One or more processors retrieve a historical digital footprint of a user. The historical digital footprint is a record of past digital data about the user, and describes a pattern of activities of the user. The processor(s) generate a simulated digital footprint for the user. The simulated digital footprint conforms to the pattern of activities of the user, and describes simulated current activities of the user. The processor(s) transmit the simulated digital footprint to the public while a current real digital footprint is being created for the user, such that use of the pattern of activities of the user provides an imperceptible transition from the historical digital footprint to the simulated digital footprint, and where the simulated digital footprint prevents the public from accessing the current real digital footprint of the user.

19 Claims, 5 Drawing Sheets

(58) Field of Classification Search
CPC ......... G06F 21/62; G06F 9/455; G06N 3/006; H04L 9/00; H04L 29/08; H04L 67/02
USPC ...................................... 726/26, 19
See application file for complete search history.

(56) References Cited

U.S. PATENT DOCUMENTS

| | | |
|---|---|---|
| 2014/0089660 A1 | 3/2014 | Sarangshar et al. |
| 2014/0287723 A1 | 9/2014 | Lafever et al. |
| 2015/0242648 A1* | 8/2015 | Lemmey ................ G06F 21/62 726/30 |
| 2016/0021064 A1* | 1/2016 | Lock ................... G06F 16/9566 726/26 |
| 2016/0170778 A1* | 6/2016 | Kalyanpur .............. G06F 9/455 703/22 |
| 2018/0172822 A1* | 6/2018 | Phillips .................. G01S 13/90 |

OTHER PUBLICATIONS

L. Law et al., "How to Make a Mint: The Cryptography of Anonymous Electronic Cash", National Security Agency Office of Information Security Research and Technology, Cryptology Division, Jun. 18, 1996, pp. 1-29.

* cited by examiner

SELECTIVELY REDACTING DIGITAL FOOTPRINT INFORMATION IN ORDER TO IMPROVE COMPUTER DATA SECURITY

BACKGROUND

The present invention relates to the field of computers, and particularly to computers that provide digital footprint data to the public. Still more particularly, the present invention relates to selectively redacting digital footprint data before releasing it to the public by using simulated digital footprint data.

SUMMARY

In one or more embodiments of the present invention, a computer-implemented method improves a computer system's security. One or more processors retrieve a historical digital footprint of a user. The historical digital footprint is a record of past digital data about the user that is available to a public, and describes a pattern of activities of the user. The processor(s) generate a simulated digital footprint for the user. The simulated digital footprint conforms to the pattern of activities of the user, and describes simulated current activities of the user. The processor(s) transmit the simulated digital footprint to the public while a current real digital footprint is being created for the user, such that use of the pattern of activities of the user provides an imperceptible transition from the historical digital footprint to the simulated digital footprint, and where the simulated digital footprint prevents the public from accessing the current real digital footprint of the user.

The described invention may also be implemented in a computer system and/or as a computer program product.

DETAILED DESCRIPTION

Figure 1:
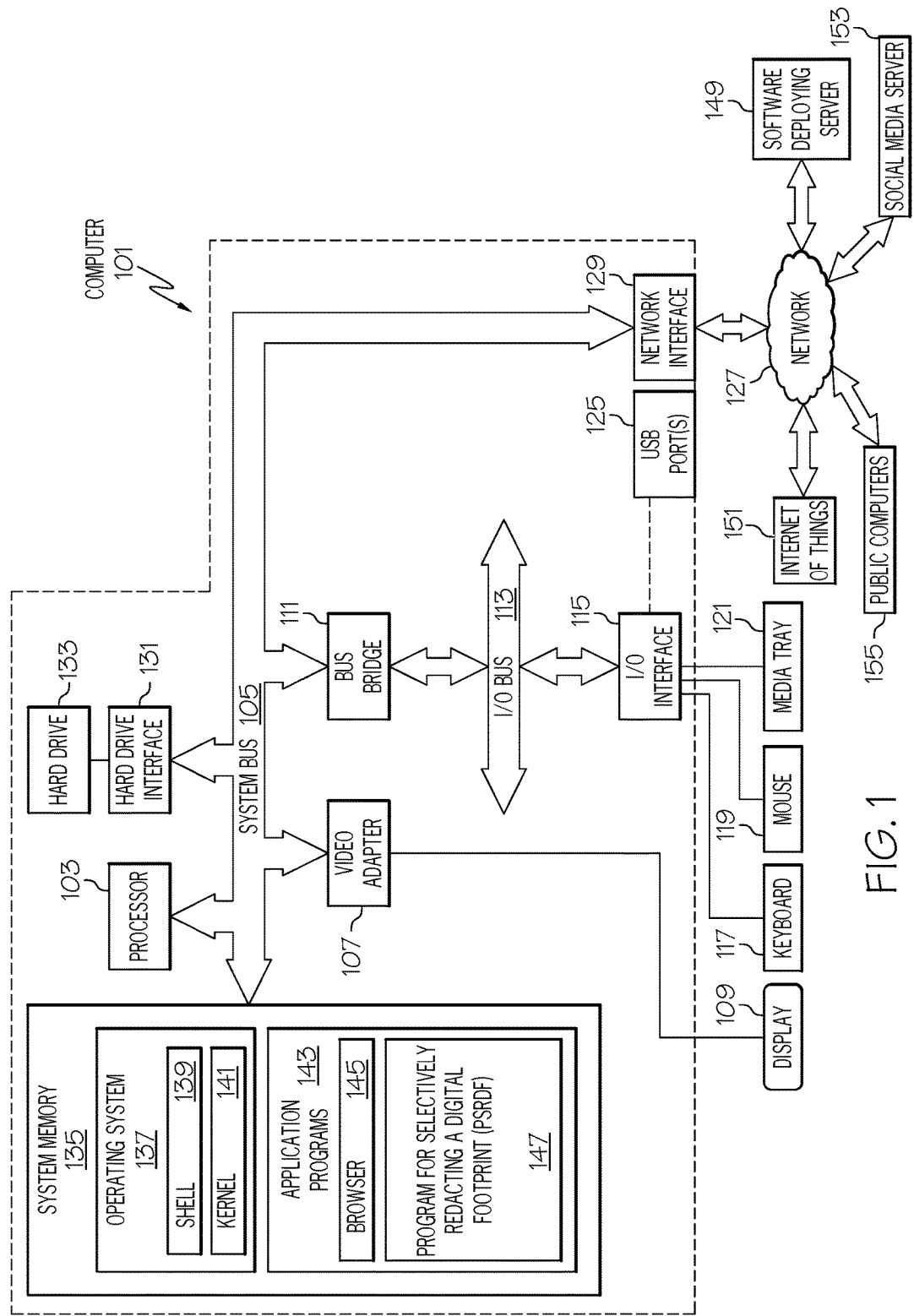
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or devices with an Internet of Things (IoT) 151 and/or a social media server 153 and/or public computers 155 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Selectively Redacting a Digital Footprint (PSRDF) 147. PSRDF 147 includes code for implementing the processes described below, including those described in FIGS. 2-3. In one embodiment, computer 101 is able to download PSRDF 147 from software deploying server 149, including in an on-demand basis, wherein the code in PSRDF 147 is not downloaded until needed for execution. In one embodiment of the present invention, software deploying server 149 performs all of the functions associated with the present invention (including execution of PSRDF 147), thus freeing computer 101 from having to use its own internal computing resources to execute PSRDF 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Being "on the grid" is defined as being accessible online via a network such as the Internet. That is, when on the grid, a person is able to send and receive email, receive text messages, access webpages, post to his/her social media website, receive cellular phone calls, etc. Thus, a person who is "on the grid" is able to access the services of electronic communication systems such as cellular phone service, the Internet, email, social media, etc.

There are times that a person wants to go "off the grid" (i.e., not share real communications, let others know where he/she is, etc.) but not let others know that he/she is off the grid. That is, a person may want to not be reachable via email, phone calls, text messages, social media postings, etc. This could be for important privacy and safety reasons or as a personal preference. That is, a person may need to privately step away from their daily routines (for personal safety reasons or health-related reasons), a celebrity may wish to avoid the paparazzi by taking a vacation to a secret location, etc. However, if a person stops all of their data from flowing out onto communication networks (i.e., the Internet, cellular networks, etc.), the sudden change may be noticed by others who analyze the data, which may lead to detecting that the person is not behaving in a typical manner (i.e., is not following typical behavior activities/patterns).

The present invention solves the problem of a person, who has gone off the grid, being identified because of changes in his/her data patterns. That is, if a person suddenly stops responding to text messages, emails, social media postings, etc., then it may be noticeable to the public that this person is no longer in his/her usual location, performing his/her usual activities, etc. The present invention is able to generate a simulated digital footprint of current activities that mimics those of the user, thus enabling the user to protect their privacy.

As described herein, the presently presented system provides a simulated digital footprint that simulates a user in daily routine activities (e.g., at home or work according to a known routine for the user), or else simulates a new routine while traveling, working at a different job, etc. That is, in the first scenario, a person who wants to simulate that they are living their routine day to day life may have data generated as if he/she was living his/her normal day to day life. In the second scenario, data may be generated as if the user is going off to a simulated destination (e.g., a vacation spot). In the second scenario, the system may generate a simulated digital footprint that reflects the time zone, activities, etc. that one would be expected to encounter at the simulated destination.

The present invention may also provide the person who is going off the grid with an alternate persona (i.e., an alias) to be generated. That is, while the simulated digital footprint is being presented to the public about a real user, a real digital footprint is being generated about an alias for the user.

For example, assume that a user needs to go secretly to location A for a week (e.g. for personal safety reasons). The present invention generates a simulated digital footprint (e.g., text messages, social media postings, photographs, locations, etc.) that represents the user as being in location B for the week. Thus, those who normally follow/communicate with the user receive the simulated digital footprint. However, while the user is actually in location A for the week, the user may want a real digital footprint of his/her activities while in location A (e.g., movement detected by a global positioning system (GPS) system, cell phone calls, etc.). As such, the present invention maintains this real digital footprint (in connection with the false identity) for later retrieval by the user (and optionally for later sharing with the public after abandoning the simulated identity).

In one or more embodiments, the present invention uses analytics to generate data as if it were coming from sensors, such as an Internet of Things (IoT) device (e.g., a health monitor, a cell phone, etc.) worn or otherwise in the possession of the user.

One advantage of the present invention is that while a person is incognito, he/she still appears to be living his/her regular life (either locally or at a simulated remote destination). If an alternate persona/alias has been created for the user, a simulated history of digital data (e.g., simulated IoT data) may be generated in order to simulate that the "simulated" person has been in existence for a long period of time, even before he/she arrives at the real (but secret) location and/or is engaged in real (but secret) activities. This enhances the security of the user's alias, since a person's electronic trail/footprint generally does not commence all at once with no prior digital data history. Thus, the creation of a simulated historical digital footprint allows a user to "step into" an alias/alternate persona without arousing public suspicion that could undermine personal privacy objectives.

In one embodiment, the present invention utilizes data being transmitted from sensors such as IoT devices directly. In one embodiment, this data is sent to a private storage device (e.g., a private cloud), which is then used to create a simulated digital footprint for the user.

As described herein, when simulated/manufactured data is being sent out to the public, the actual real data is temporarily stored in another location to be retrieved if/when the user wants it. In addition, one or more embodiments of the present invention keep alternate persona profiles going if the alias must be activated for an extended period.

The present invention thus generates data for a designated amount of time based on historical activities of the device owner (user) and others and the stated activities/locations of the device owner.

Thus and in accordance with one or more embodiments of the present invention, a system and method replicate personal data as produced by an IoT Device, where the device generates data to simulate the activities a person would be producing, where data consumers are not aware of any differences between the place/activities where the user is supposedly at and the data that is being produced by the actual place/activities of the user. Thus, the person's actual data can replace the simulated/manufactured data after the end of the simulation.

In various embodiments of the present invention, the IoT device owner can state that he/she will be doing his/her regular activities or is going/doing something else that is atypical.

The generated data can come from the IoT device itself or from a private cloud.

In accordance with various embodiments of the present invention, the generated data for regular activities are based on averages for the person. That is, if historical digital footprints indicate that the user routinely accesses certain email accounts, checks a particular social media webpage, checks on certain public webpages on the Internet, etc., then these average activities are used to generate the simulated digital footprint described herein.

The generated data, when used to replicate that the user is at a simulated destination/location, may account for travel, time zone differences, and/or generated itineraries.

In various embodiments, the generated data for simulated activities is based on increasing/decreasing the activities in line with standard deviations of others that are doing those activities. For example, assume that the simulated destination for the user is Location A, where a typical activity may be to visit Landmark X (e.g., a museum), travel on Transport Y (e.g., a subway), etc. As such, the system will use these activities as a basis for the simulated digital footprint that indicates that the user is at Location A.

In an embodiment of the present invention, images/posts to social networks are simulated with available pictures at the rate the device owner would normally post on those social networks or other electronic public forums. For example, the system may generate and post simulated postings to the user's social media webpage showing (with the aid of computer enhanced/generated photos) the user standing next to Landmark X at Location A, even though the user is actually 1,000 miles away.

If the simulated digital footprint is stored in a private cloud, a unique identifier for the location of the simulated digital footprint is known only to the secure system and/or the user.

As described herein, once the user is no longer incognito (i.e., under a simulated identity that is supported by the simulated digital footprint), the actual data generated while the user is actually at the real (but previously secret) location may replace the simulated generated data that was used to hide the fact that the user was at another location.

In order to produce a legacy for the false/alternate/simulated persona used by the user when traveling at a secret destination or otherwise performing activities that are to be shielded from the public, a simulated on-line persona for the user is generated. The simulated historical digital footprint for this simulated on-line persona may use data that appears as if it were produced by an IoT Device, which generates data to simulate the activities of a person as if that person existed.

As with the generation of the simulated digital footprint, the system can emulate actual activities of the user to create the false persona, or historical data (of the false persona) may be completely derived by analytics. That is, a computer may evaluate patterns from historical digital footprints of the user, and then emulate these patterns when generating the simulated historical digital footprints.

As with the generation of the real digital footprint, the generated data may come from the device itself or from a private cloud, and the generated data for regular activities may be based on averages for a person as defined in the alternate persona.

Figure 2:
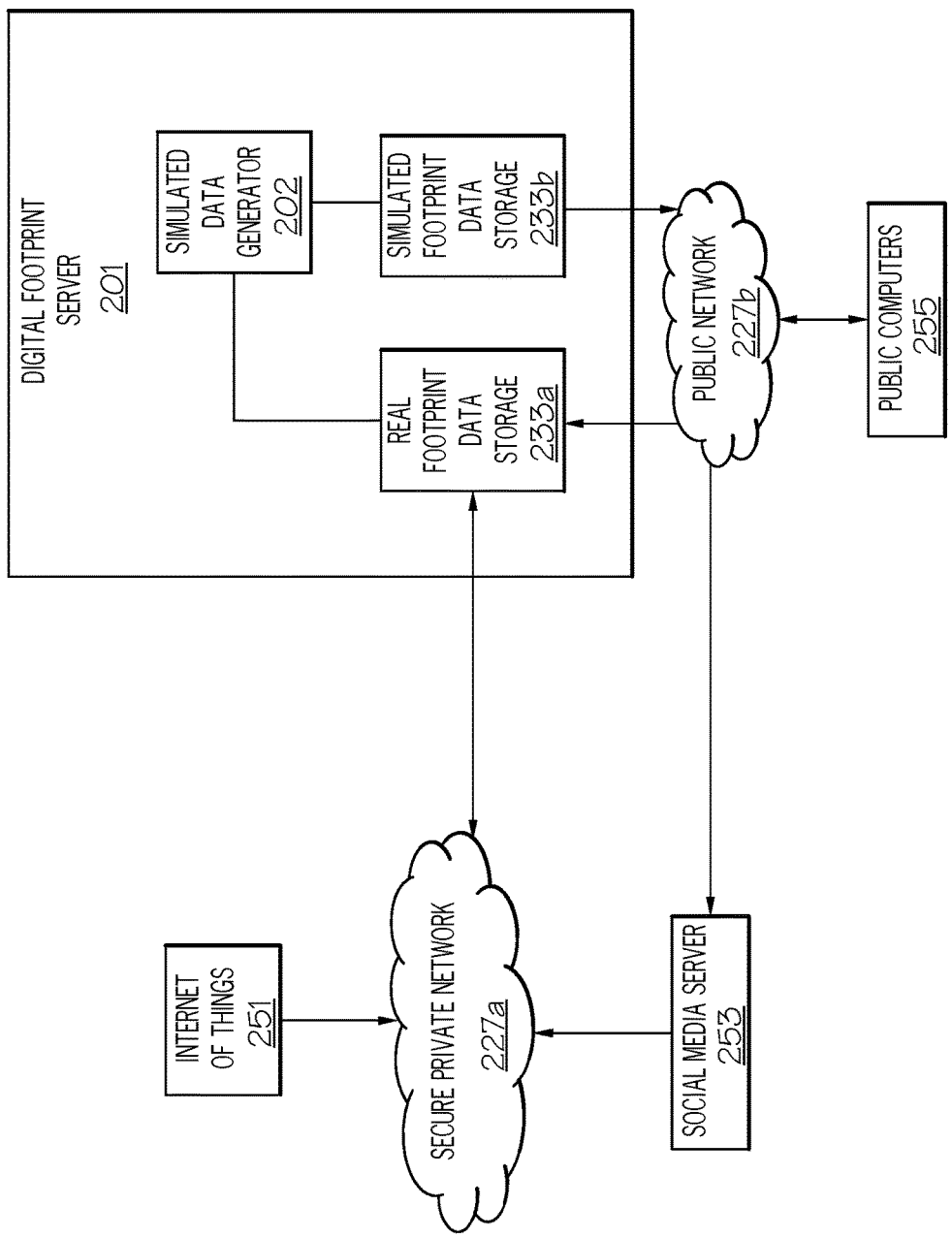
FIG. 2 illustrates an interaction among a digital footprint server, public computers, and various sources of digital footprints.

With reference now to FIG. 2, assume that a digital footprint server 201 (analogous to computer 101 shown in FIG. 1) is controlling not only the generation of digital footprints for a particular user, but also which digital footprint (real or simulated) is shown to the public.

For example, assume that digital footprint server 201 has received, via a secure private network 227a (analogous to network 127 shown in FIG. 1), data from a social media server 253, an Internet of Things 251 (e.g., biometric sensors attached to the user, a smart phone, a GPS tracking/navigation device, etc.), and any other device (e.g., systems that track travel reservations, hotel reservations, etc.) to create a real digital footprint that describes a particular user. This real digital footprint is stored in the real footprint data storage 233a (analogous to hard drive 133 shown in FIG. 1).

However, a simulated data generator 202 (e.g., processor 103 running the PSRDF 147) is also able to generate a simulated digital footprint, which is stored in simulated footprint data storage 233b. As such, public computers 255 (e.g., that operate email, text messages, check social media postings, etc. about the user) are able to send email, text messages, social media postings, etc. to the digital footprint server 201, but only simulated digital footprint data is sent from the digital footprint server 201 to the public computers 255 while the user of the digital footprint server 201 is incognito.

Figure 3:
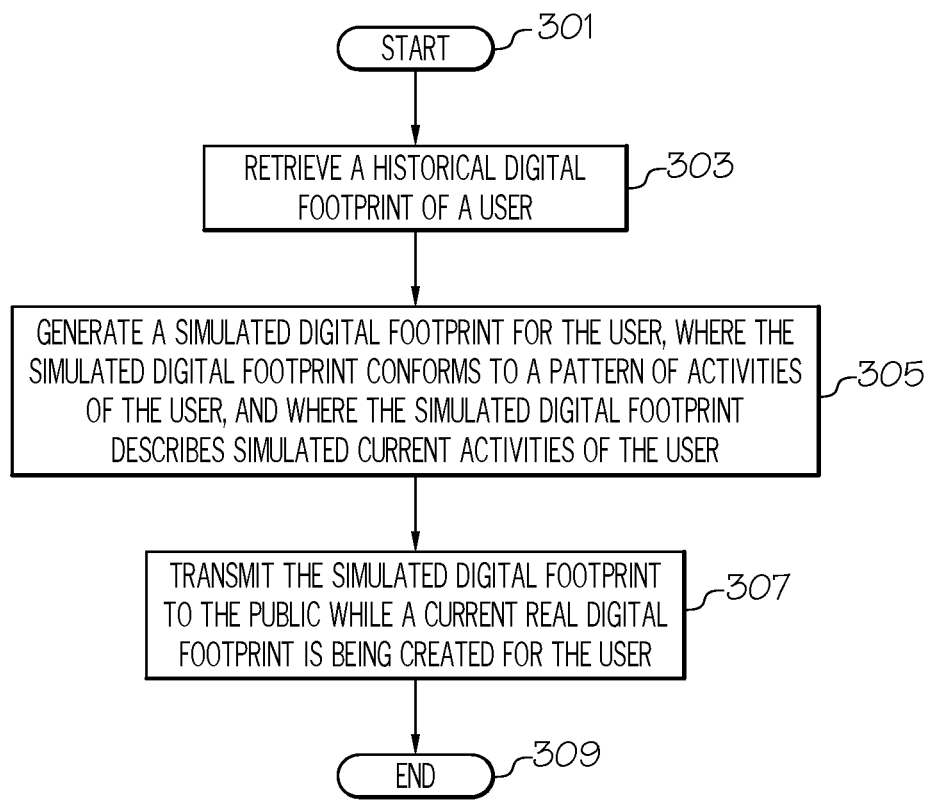
FIG. 3 is a high-level flow chart of one or more steps performed by one or more processors and/or other hardware devices to improve the security of a computer in accordance with one or more embodiments of the present invention.

With reference now to FIG. 3, a high-level flow chart of one or more steps performed by one or more processors and/or other hardware devices to improve the security of a computer in accordance with one or more embodiments of the present invention is presented.

After initiator block 301, one or more processors (e.g., within digital footprint server 201 shown in FIG. 2) retrieve a historical digital footprint of a user, as described in block 303. This historical digital footprint is a record of past digital data about the user that is available to a public, and the historical digital footprint describes a pattern of activities about the user.

For example, assume that a particular user has a history of checking emails at certain times of the day from his/her office, of being in his/her office during certain hours, uses certain phrases and/or terms in his/her electronic communication, wears a fitness monitor that generates a certain pattern of health data (heart rate, respiratory rate, body temperature, etc.) that is produced daily (e.g., certain heart rate levels at certain times of the day when the user is running, walking, sitting, etc.), etc. This historical digital footprint is a historical "true" digital footprint for the user, and follows the pattern just described.

The user's "real" and current digital footprint (i.e., of real-time activities such as writing emails, moving about, etc.) would also follow this historical pattern. Thus, if a simulated digital footprint is created, it will have patterns that match the pattern of the historical digital footprint. Otherwise, the public would not be fooled by the simulated digital footprint. For example, if the user were suddenly to stop responding to emails, or started responding to emails using unusual syntaxes, or were to demonstrate a change of physical activity based on an IoT device such as an activity monitor, then the public may conclude that the current digital footprint is simulated, and that the user has gone off the grid.

Similarly, if the user were to go to a location other than where he/she claims to be, and the digital footprint is unrealistic, then the public would recognize that the user is not at the location where he/she claims to be. For example, assume that the user claims to be in Montana, but is actually in New York City. If the simulated digital footprint of the user shows him/her traveling at a speed and direction indicative of traveling on a subway, then the user's claim to be in Montana would be quickly doubted by the public. Thus, the simulated data generator 202 will not only mimic the user's historical digital footprint (e.g., syntax used in communications), but will also create simulated movement data that hides the movement of the user riding the subway, and will also simulated the time zones, such that it appears (based on the simulated digital footprint being generated) that the user is riding in a car in Montana at 5:00 p.m. in the Mountain Time Zone when he/she is actually riding a subway in New York City at 7:00 p.m. in the Eastern Time Zone.

In an embodiment of the present invention, digital footprints of others are used to bolster the simulated digital footprint of the user. For example, assume that a certain user always travels with a certain companion, who has his/her own digital footprint (generated by his/her smart phone, etc.). If the person is claiming to be traveling to Location A, but there is no real-time digital footprint for this companion at Location A, then the public may suspect that the user is not really at Location A. As such, a simulated digital footprint is also created by the digital footprint server 201 for the companion, in order to bolster the simulated digital footprint of the user.

With reference now to block 305 in FIG. 3, one or more processors thus generate a simulated digital footprint for the user, where the simulated digital footprint conforms to the pattern of activities of the user (e.g., certain syntaxes in emails and sleep patterns of the user), and where the simulated digital footprint describes simulated current activities of the user (e.g., riding in a car in Montana).

As described in block 307 in FIG. 3, one or more processors transmit the simulated digital footprint (e.g., from the simulated persona data storage 233*b* shown in FIG. 2) to the public (e.g., who use public computers 255) while a current real digital footprint is being created (and stored in the real persona data storage 233*a*) for the user. This current real digital footprint is a digital record of the user's actual activities, which are shielded from the public. Thus, use of the pattern of activities of the user provides an imperceptible transition from the real digital footprint to the simulated digital footprint, and the simulated digital footprint prevents the public from accessing the real digital footprint of the user. That is, the pattern of activities is used to emulate the person staying at a certain location and/or doing certain activities, or else the pattern of activities is used as a baseline from which other activities are represented.

The flow chart ends at terminator block 309.

In an embodiment of the present invention, one or more processors create a simulated identity (i.e., an alias, a false persona) of the user that includes a record of a simulated historical digital footprint describing simulated past activities of the user. That is, while the user is engaged in activities (e.g., traveling to secret locations, etc.), that user will still be generating a real digital footprint by the IoT devices that he/she is using, the electronic communications that he/she is exchanging, etc. As such, a person monitoring this real digital footprint will recognize that it is an alias unless a simulated historical digital footprint has been generated, to give the appearance of a real person (that the user can use as an alias). Thus, at the time that the user takes up the alias, the simulated historical digital footprint seamlessly transitions into the user's real digital footprint under the alias/false persona.

In an embodiment of the present invention, the current real digital footprint of the user is generated from a first set of sensors readings, such as those generated by the user's cell phone, fitness monitor, navigation system, etc. The simulated digital footprint of the user is generated from a second set of sensors readings, which may be generated from a same or different set of sensors that generated the first set of sensors readings.

As described herein, in an embodiment of the present invention the simulated digital footprint is retrieved from a storage device. That is, the simulated digital footprint is not generated "on the fly" using real time sensor data, but rather is a pre-generated and stored simulated digital footprint that has been generated to emulate patterns found in the real digital footprint of the user.

In an embodiment of the present invention, the current real digital footprint is generated as long as the simulated digital footprint is transmitted to the public. That is, as the simulated digital footprint is being transmitted to the public, a real digital footprint of activities of the user (i.e., at a secret location, being engaged in secret activities, etc.) is also being created. As soon as the simulated digital footprint is no longer being transmitted to the public, the system provides the current real digital footprint to the user and/or to the public. Thus, the user is able then to retrieve his/her real digital footprint of activities that occurred while he/she was in a secret location engaged in activities, which can be shared with the public at the discretion of the user. However, if the user does not choose to share the real digital footprint of activities performed while the user was incognito, then steps must be taken to transition back to the current real digital footprint.

If the user has secretly been out of town for a week and then returns to his/her office, then the system will monitor current real time activities of the user to determine a real-time pattern for the current digital footprint. The simulated digital footprint (which covered for the user while the user was at the secret location engaged in secret activities) will be adjusted to seamlessly ease into the current real time digital footprint.

For example, assume that the simulated digital footprint had shown the user checking (i.e., opening) emails every ten minutes. When the user returns to his/her desk, he/she may want to check his/her emails every minute. In order to avoid an abrupt change in activities represented by the user's current real time digital footprint, the simulated digital footprint will be "ramped up" over the course of a day or two to start checking/opening emails more frequently until it (falsely) appears to be checking email every minute. At that point, the user's real digital footprint can replace the simulated digital footprint, such that no abrupt transition occurs.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
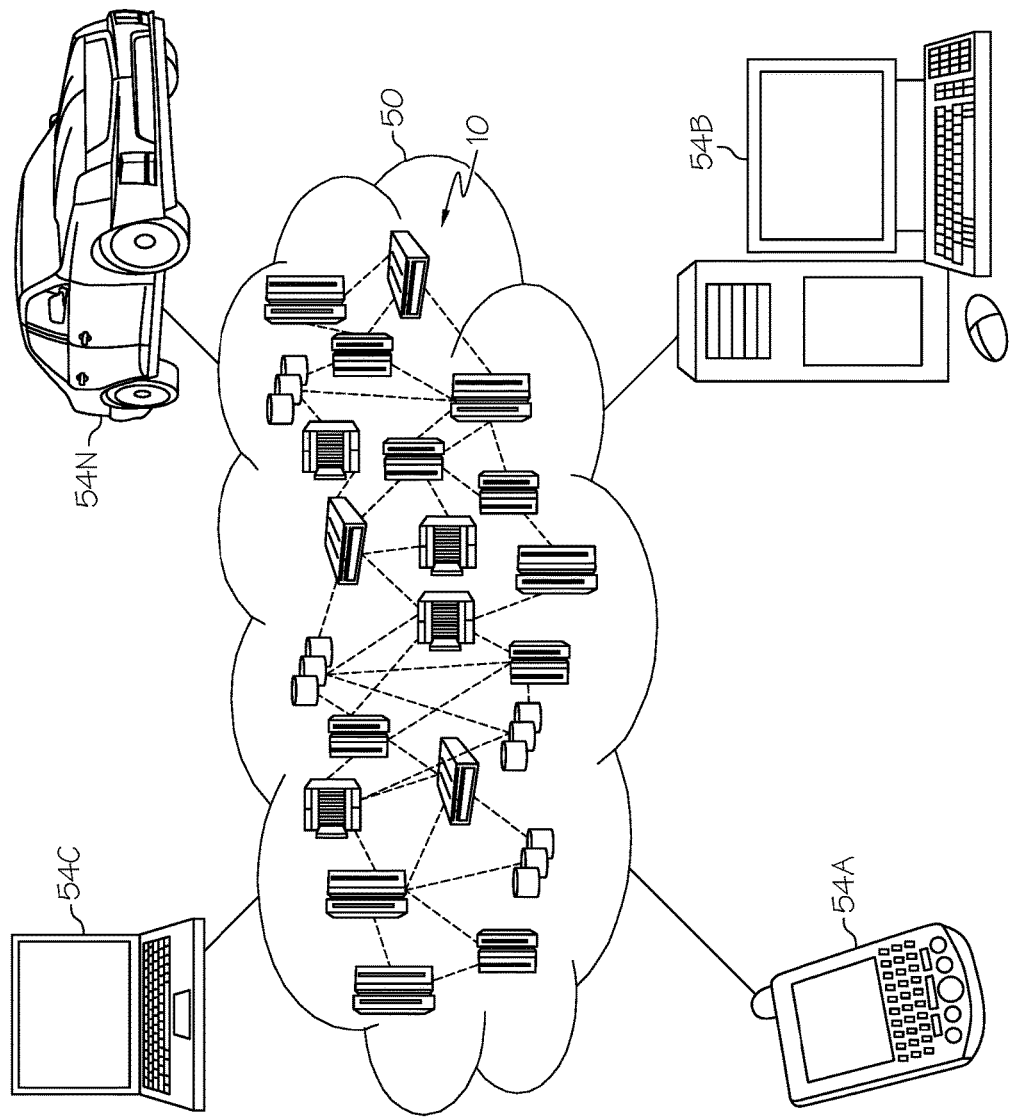
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
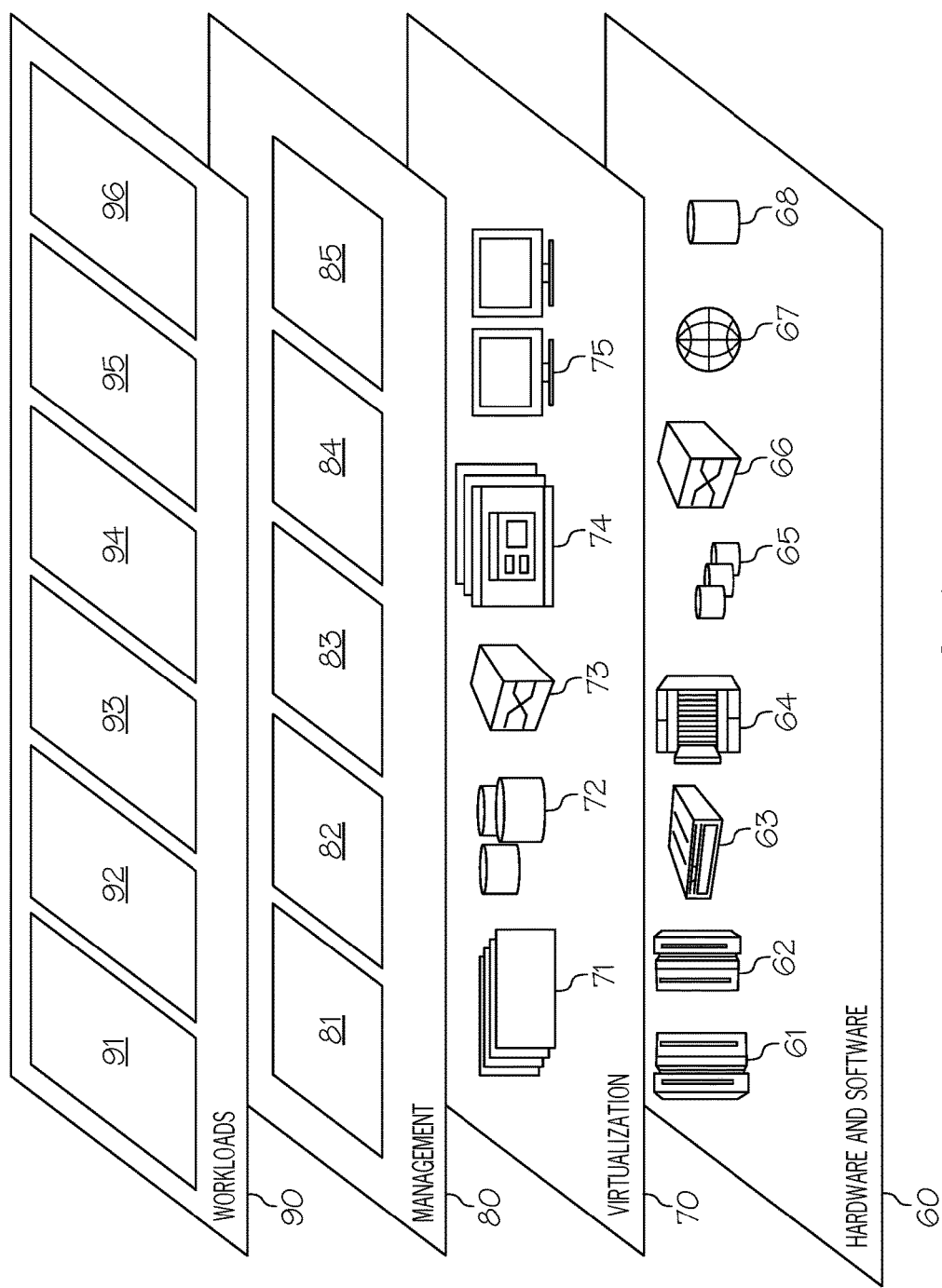
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer security processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for protecting user privacy, the computer-implemented method comprising:
    retrieving, by one or more processors, a historical digital footprint of a user, wherein the historical digital footprint is a record of past digital data about the user that is available to a public, and wherein the historical digital footprint describes a pattern of routine activities related to social communications from the user;
    generating, by one or more processors, a simulated digital footprint for the user, wherein the simulated digital footprint conforms to the pattern of routine activities related to the social communications from the user, and wherein the simulated digital footprint describes simulated current activities of the user;
    transmitting, by one or more processors, the simulated digital footprint to the public while a current real digital footprint of real-time activities of the user is being created for the user, wherein use of the pattern of routine activities related to the social communications from the user provides an imperceptible transition from the historical digital footprint to the simulated digital footprint, and wherein the simulated digital footprint prevents the public from accessing the current real digital footprint of the user; and
    adjusting, by one or more processors, the simulated digital footprint of the user to simulate a new routine of the user while at a second location, wherein the user is actually at a different first location.

2. The computer-implemented method of claim 1, further comprising:
    creating, by one or more processors, a simulated identity of the user that includes a record of a simulated historical digital footprint describing simulated past activities of the user.

3. The computer-implemented method of claim 1, wherein the current real digital footprint of the user is generated from a first set of sensors readings that track activities of the user.

4. The computer-implemented method of claim 3, wherein the simulated digital footprint of the user is generated from a second set of sensors readings.

5. The computer-implemented method of claim 4, wherein a same set of sensors generates both the first set of sensors readings and the second set of sensors readings.

6. The computer-implemented method of claim 1, wherein the simulated digital footprint is retrieved from a storage device.

7. The computer-implemented method of claim 1, wherein the current real digital footprint is generated as long as the simulated digital footprint is transmitted to the public, and wherein the computer-implemented method further comprises:
    ceasing, by one or more processors, transmission of the simulated digital footprint to the public; and
    in response to ceasing the transmission of the simulated digital footprint to the public, providing, by one or more processors, the current real digital footprint to the user.

8. The computer-implemented method of claim 1, further comprising:
    adjusting, by one or more processors, the simulated digital footprint of the user to simulate the user being in the second location by posting altered photographs depicting the user in the second location while the user is actually in the different first location.

9. The computer-implemented method of claim 1, wherein the user is a first person, wherein the simulated digital footprint is a first simulated digital footprint of the first person while at a first location, and wherein the computer-implemented method further comprises:
    generating, by one or more processors, a second simulated digital footprint of a second person who historically always travels with the first person, wherein the second simulated digital footprint simulates the second person being at the first location at a same time as the first person; and
    publishing, by one or more processors, the first simulated digital footprint of the first person while at the first location and the second simulated digital footprint of the second person being at the first location at the same time as the first person in order to bolster the first simulated digital footprint of the first person, even though the first person is currently at a different second location.

10. The computer-implemented method of claim 1, wherein the historical digital footprint of the user shows the user performing a digital task at a first frequency level, wherein the simulated digital footprint initially reflects the first frequency level at which the user performed the digital task, and wherein the computer-implemented method further comprises:
gradually adjusting, by one or more processors, the first frequency level at which the user performs the digital task in the simulated digital footprint until the first frequency level reaches a second frequency level, wherein the second frequency level is a new frequency level at which the user will perform the digital task when the user replaces the simulated digital footprint with a new real-time digital footprint.

11. A computer program product for improving a computer system's security through use of a simulated digital footprint, the computer program product comprising a non-transitory computer readable storage device having program instructions embodied therewith, the program instructions readable and executable by a computer to perform a method comprising:
retrieving a historical digital footprint of a user, wherein the historical digital footprint is a record of past digital data about the user that is available to a public, and wherein the historical digital footprint describes a pattern of routine activities related to social communications from the user;
generating a simulated digital footprint for the user, wherein the simulated digital footprint conforms to the pattern of routine activities related to the social communications from the user, and wherein the simulated digital footprint describes simulated current activities of the user;
transmitting the simulated digital footprint to the public while a current real digital footprint of real-time activities of the user is being created for the user, wherein use of the pattern of routine activities related to the social communications from the user provides an imperceptible transition from the historical digital footprint to the simulated digital footprint, and wherein the simulated digital footprint prevents the public from accessing the current real digital footprint of the user; and
adjusting the simulated digital footprint of the user to simulate a new routine of the user while at a second location, wherein the user is actually at a different first location.

12. The computer program product of claim 11, wherein the method further comprises:
creating a simulated identity of the user that includes a record of a simulated historical digital footprint describing simulated past activities of the user.

13. The computer program product of claim 11, wherein the current real digital footprint of the user is generated from a first set of sensors readings.

14. The computer program product of claim 13, wherein the simulated digital footprint of the user is generated from a second set of sensors readings.

15. The computer program product of claim 14, wherein a same set of sensors generates both the first set of sensors readings and the second set of sensors readings.

16. The computer-implemented method of claim 1, wherein the simulated digital footprint simulates the user in daily routine activities at home.

17. The computer program product of claim 11, wherein the current real digital footprint is generated as long as the simulated digital footprint is transmitted to the public, and wherein the method further comprises:
ceasing transmission of the simulated digital footprint to the public; and
in response to ceasing the transmission of the simulated digital footprint to the public, providing the current real digital footprint to the user.

18. The computer program product of claim 11, wherein the program instructions are provided as a service in a cloud environment.

19. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to retrieve a historical digital footprint of a user, wherein the historical digital footprint is a record of past digital data about the user that is available to a public, and wherein the historical digital footprint describes a pattern of routine activities related to social communications from the user;
program instructions to generate a simulated digital footprint for the user, wherein the simulated digital footprint conforms to the pattern of routine activities related to the social communications from the user, and wherein the simulated digital footprint describes simulated current activities of the user;
program instructions to transmit the simulated digital footprint to the public while a current real digital footprint of real-time activities of the user is being created for the user, wherein use of the pattern of routine activities related to the social communications from the user provides an imperceptible transition from the historical digital footprint to the simulated digital footprint, and wherein the simulated digital footprint prevents the public from accessing the current real digital footprint of the user; and
program instructions to adjust the simulated digital footprint of the user to simulate a new routine of the user while at a second location, wherein the user is actually at a different first location.

* * * * *